United States Patent
Wang et al.

(10) Patent No.: US 12,142,818 B2
(45) Date of Patent: Nov. 12, 2024

(54) HUMAN AND GESTURE SENSING IN A COMPUTING DEVICE

(71) Applicant: Google LLC, Mountain View, CA (US)

(72) Inventors: Jian Wang, Cupertino, CA (US); David J. Weber, San Carlos, CA (US); Jiang Zhu, Cupertino, CA (US); Maryam Tabesh, San Francisco, CA (US); Arnold Feldman, San Francisco, CA (US); Jaime Lien, Mountain View, CA (US)

(73) Assignee: Google LLC, Mountain View, CA (US)

( * ) Notice: Subject to any disclaimer, the term of this patent is extended or adjusted under 35 U.S.C. 154(b) by 278 days.

(21) Appl. No.: 17/616,059

(22) PCT Filed: Jun. 24, 2020

(86) PCT No.: PCT/US2020/039412
§ 371 (c)(1),
(2) Date: Dec. 2, 2021

(87) PCT Pub. No.: WO2020/264018
PCT Pub. Date: Dec. 30, 2020

(65) Prior Publication Data
US 2022/0302576 A1   Sep. 22, 2022

Related U.S. Application Data

(60) Provisional application No. 62/947,672, filed on Dec. 13, 2019, provisional application No. 62/866,082, filed on Jun. 25, 2019.

(51) Int. Cl.
*G06F 3/041*   (2006.01)
*G01S 13/88*   (2006.01)
(Continued)

(52) U.S. Cl.
CPC ............. *H01Q 1/243* (2013.01); *G01S 13/88* (2013.01); *G06F 3/017* (2013.01); *H01Q 1/44* (2013.01)

(58) Field of Classification Search
None
See application file for complete search history.

(56) References Cited

U.S. PATENT DOCUMENTS 8,593,418 B2 * 11/2013 Blow .................. G06F 3/04817
345/173
9,122,335 B2 *  9/2015 Corrion ................ G06F 3/0416
(Continued)

FOREIGN PATENT DOCUMENTS

CN   106489080 A    3/2017
WO   2017131545 A1  8/2017

OTHER PUBLICATIONS

International Preliminary Report on Patentability from International Application No. PCT/US2020/039412, dated Jan. 6, 2022, 10 pp.
(Continued)

*Primary Examiner* — Tuan A Tran
(74) *Attorney, Agent, or Firm* — Shumaker & Sieffert, P.A.

(57) ABSTRACT

Devices are provided that include radar circuits arranged to send and receive radar signals that can be used to, for example, detect gestures performed in the vicinity of the device. Arrangements of the circuits and associated antennas allow for the device to have no bezel or a minimal bezel.

18 Claims, 8 Drawing Sheets

(51) Int. Cl.
*G06F 3/01* (2006.01)
*G06F 3/044* (2006.01)
*G06F 3/0488* (2022.01)
*H01Q 1/24* (2006.01)
*H01Q 1/44* (2006.01)

(56) References Cited

U.S. PATENT DOCUMENTS

| | | | |
|---|---|---|---|
| 9,442,554 B1* | 9/2016 | Arscott | G06F 1/3231 |
| 9,477,337 B2* | 10/2016 | Cady | G06F 3/04883 |
| 9,537,515 B2 | 1/2017 | Deyle | |
| 9,582,122 B2* | 2/2017 | Bathiche | G06F 3/0412 |
| 9,946,383 B2* | 4/2018 | Cady | G06F 3/0488 |
| 10,078,377 B2* | 9/2018 | Balan | G06T 19/006 |
| 10,528,195 B2* | 1/2020 | Lee | G06F 3/041 |
| 2011/0181510 A1 | 7/2011 | Hakala et al. | |
| 2012/0026040 A1* | 2/2012 | Hohne | H01Q 3/267 |
| | | | 342/372 |
| 2012/0182222 A1 | 7/2012 | Moloney | |
| 2015/0277569 A1 | 10/2015 | Sprenger et al. | |
| 2016/0171780 A1* | 6/2016 | Vardi | G06F 3/014 |
| | | | 345/419 |
| 2016/0202114 A1 | 7/2016 | Alameh et al. | |
| 2016/0234365 A1 | 8/2016 | Alameh et al. | |
| 2017/0052618 A1* | 2/2017 | Lee | G09G 5/006 |
| 2018/0224980 A1 | 8/2018 | Avila et al. | |

OTHER PUBLICATIONS

Response to Communication Pursuant to Rules 161(1) and 162 EPC dated Jan. 7, 2022, from counterpart European Application No. 20742544.8, filed Jul. 14, 2022, 33 pp.

Lien et al., "Soli: Ubiquitous Gesture Sensing with Millimeter Wave Radar", Google ATAP, Published Jul. 2016, 19 pp.

Park et al., "An Optically Invisible Antenna-on-Display (AoD) Concept for Millimeter-wave 5G Cellular Devices", IEEE Transaction on Antennas and Propagation, published Feb. 2019, 13 pp.

International Search Report and Written Opinion of International Application No. PCT/US2020/039412, mailed Oct. 5, 2020, 16 pp.

Communication pursuant to Article 94(3) EPC from counterpart European Application No. 20742544.8 dated Apr. 23, 2024, 9 pp.

First Office Action and Search Report, and translation thereof, from counterpart Chinese Application No. 202080044618.1 dated Sep. 10, 2024, 23 pp.

* cited by examiner

HUMAN AND GESTURE SENSING IN A COMPUTING DEVICE

BACKGROUND

Devices may employ a variety of technologies to receive input from a user. For example, a user may provide input to a device by depressing one or more buttons and by entering text using the keys of a keypad. A device may include a microphone to detect and respond to a user's voice. A touch-sensitive surface may be provided standalone or disposed over a display screen to detect and respond to a user's touch. A camera may be used for photography and also for authenticating a user. Other input-sensing devices may detect motion imparted to the mobile device by sensing acceleration, rotation, compass direction, and geographical location.

A mobile device may be constrained in size in order to facilitate its transportation and convenience of use. For example, a mobile telephone may be designed to be used while held in the hand of a user. In addition to other mobile telephone components, such as processors, data storage modules, a display screen, and speakers, each of the input-sensing components previously discussed may occupy substantial physical space. Locating these input-sensing devices within the space-limited mobile device amongst the other components may prove challenging for the system architect. Additional constraints on component locations may be imposed due to power, heat-dissipation, and signal routing considerations.

SUMMARY

Generally, a computing device as disclosed may utilize radar technology to implement virtual reality or augmented reality features, perform indoor imaging, and/or to detect gestures performed by a user. To utilize such radar technology, the computing device may include radar hardware such as transmission antennas, reception antennas, and associated circuitry. However, as discussed in further detail below, it may not be desirable to locate at least some of such radar hardware behind a display panel.

In accordance with one or more aspects of this disclosure, at least a portion of the radar hardware may be located in a bezel of a computing device. The term "bezel" as used herein and as generally understood in the art refers to an area not having active display pixels that surrounds at least a portion of a display panel. For instance, one or more transmission antennas and/or one or more reception antennas may be integrated into the bezel of the computing device. In this way, a computing device may utilize radar technology without the disadvantages of transmitting and receiving through a display panel.

However, when a computing device is designed with no bezel or with a minimal bezel, it may not be possible to located radar hardware in the bezel. In accordance with one or more aspects of this disclosure, at least a portion of radar hardware may be integrated into one or more sides of the computing device. In this way, a computing device having no bezel or minimal bezel may utilize radar technology without the disadvantages of transmitting and receiving through a display panel.

As one example, a computing device may include a display panel assembly including a plurality of active display pixels arranged on a plane; a bezel surrounding at least a portion of the display panel assembly; a first radar transmission antenna disposed within the bezel; a first radar reception antenna disposed within the bezel; and a first radar integrated circuit configured to transmit radar waves via the first radar transmission antenna and receive radar waves via the first radar reception antenna, wherein the first radar transmission antenna and the first radar reception antenna are positioned to transmit and receive radar waves having a main lobe oriented in either a direction generally perpendicular to the plane of the display panel assembly or a direction generally parallel to the plane of the display panel assembly.

As another example, a computing device may include a display panel assembly comprising an active display layer including a plurality of only active display pixels, the display panel assembly defining a bezel-less display panel at a front-face of the mobile computing device; a first radar transmission antenna; a first radar reception antenna; and a first radar integrated circuit configured to transmit radar waves via the first radar transmission antenna and receive radar waves via the first radar reception antenna, wherein the first radar integrated circuit is configured to detect proximity of a user or gestures performed by a user.

The details of one or more examples are set forth in the accompanying drawings and the description below. Other features, objects, and advantages of the disclosure will be apparent from the description and drawings, and from the claims.

BRIEF DESCRIPTION OF THE DRAWINGS

The accompanying drawings, which are included to provide a further understanding of the disclosed subject matter, are incorporated in and constitute a part of this specification. The drawings also illustrate examples of the disclosed subject matter and together with the detailed description serve to explain the principles of examples of the disclosed subject matter. No attempt is made to show structural details in more detail than may be necessary for a fundamental understanding of the disclosed subject matter and various ways in which it may be practiced.

DETAILED DESCRIPTION

Figure 1:
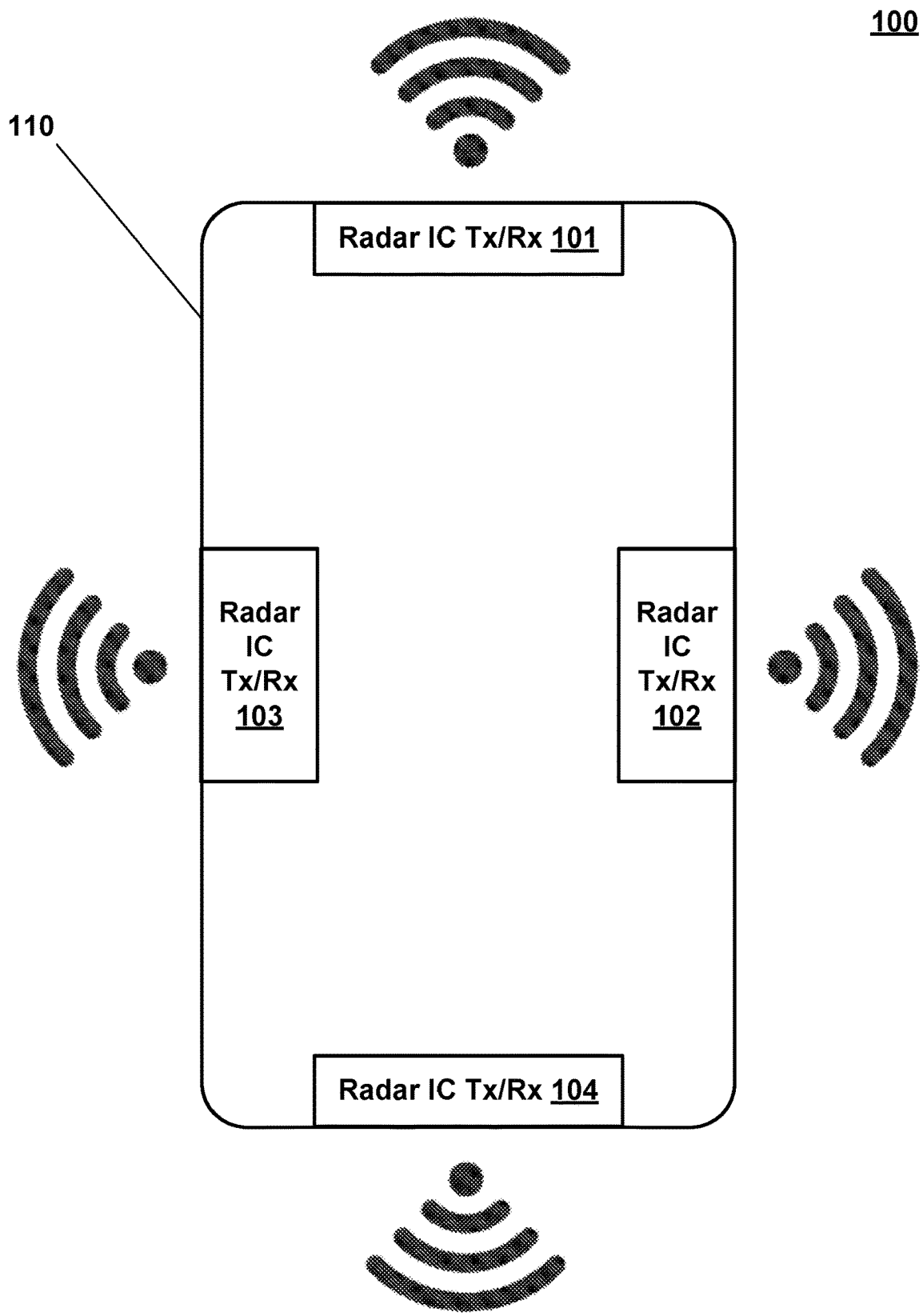
FIG. 1 is a conceptual diagram illustrating a mobile device having up to four radar integrated circuits, in accordance with one or more aspects of the disclosure.

Computing devices may be configured to receive user input via a number of modalities. For instance, a computing device may include a touch screen capable of detecting touch inputs, an accelerometer and/or a gyroscope capable of detecting motion inputs, and a microphone capable of capturing audio (e.g., voice) inputs. Each input feature or modality provided by a computing device may increase the total number of hardware components needed. Locating each hardware component within the limited space of a typical computing device may prove challenging for the system architect. In addition to the physical space requirements, locations of individual components may be constrained by power, heat-dissipation, and signal routing considerations, to name a few. Compounding the problem further, each hardware component may have specific attributes that may limit where and how it may be positioned within the computing device.

In addition to touch, motion, and voice input modalities discussed above, it may be desirable for a computing device to include hardware components capable of using radar to receive user input. For instance, a computing device as disclosed herein may incorporate radar technology to implement virtual reality or augmented reality features, perform indoor imaging, detect gestures performed by a user, or any combination thereof, or the like. To achieve these features, one or more radar integrated circuits and one or more transmit (Tx) and receive (Rx) antenna(s) may be included within the computing device. The present subject matter discloses a variety of arrangements for providing one or more radar integrated circuits and corresponding antennas configured to detect a user's gestures in conjunction with both bezel and bezel-less devices (a bezel-less device may be defined as a device having no bezel or a bezel surrounding the display panel assembly and having a thickness of 0 mm-0.5 mm. Therefore, the radar-enabled features of the device may be employed regardless of the chosen design aesthetic.

Examples of such radar components include transmission antennas, reception antennas, and associated circuitry. In general, radar signals transmitted and received by radar antennas may be attenuated by a display panel of a device, thereby reducing the range of transmission and reception. A display panel may comprise several layers, each layer contributing to the total attenuation of a radar signal. For example, components of a display panel may include a cover glass, polarizing film, adhesive, touch sensors, and a cathode. Collectively, the multiple layers of a display panel may attenuate a radar signal by 50 decibels (dB) or more. As such, it may be desirable for a radar antenna to be positioned and oriented on the computing device such that it can transmit and receive without substantial obstruction from a display panel.

In accordance with one or more aspects of this disclosure, a computing device may include one or more antennas integrated into a bezel of the computing device. A "bezel" as used herein and as generally understood in the art refers to an area not having active display pixels that surrounds at least a portion of a display panel. The bezel area in which components of the device may be install generally is understood to encompass the region beneath the bezel when viewed from a position generally normal to the display and extending between the front and back surfaces of the device. A cover glass may be positioned over both the bezel, which typically has no active pixels, and a display panel portion of the device, which includes active display pixels.

A device having a display panel may or may not include a bezel, depending on the desired aesthetic and fabrication requirements. In devices having small or no bezel regions, radar or similar circuits may be more difficult to include in the device due to the previously-described attenuation issues. In contrast to such devices, this disclosure describes techniques for incorporating radar hardware in devices that have little or no bezel area. Specifically, in accordance with one or more aspects of this disclosure, a bezel-less computing device may include one or more antennas integrated into one or more sides of the computing device. In this way, a device may still be able to receive user input via radar while also providing the aesthetic benefits of being bezel-less.

While the subsequent discussion and associated figures will describe several examples in the context of a mobile device, it should be appreciated that the examples may also apply to fixed or non-mobile devices, such as automated teller machines, kiosks, vending machines, computer terminals, fuel stations, and the like. Features of one example may be removed, combined with, or replaced with features from other examples without departing from the scope of the disclosed subject matter. In general, a mobile device may be capable of detecting increasing complex gestures by increasing the number of radar channels, which may correspond to increasing the quantity of Tx/Rx antennas incorporated within the mobile device.

FIG. 1 illustrates an example arrangement of radar components within a mobile device 100 having a bezel-less display panel 110. In a bezel-less mobile device, the display panel 110 may include only active pixels and may completely cover at least a front face of the mobile device 100 from edge to edge. In some cases, a device may have a minimal bezel that does not include an active display component, but is too small to allow for other components of the device to be positioned entirely within the bezel. For example, a minimal bezel may be 0.05 mm, 0.1 mm, 0.2 mm, 0.3 mm, 0.4 mm, 0.5 mm, or any intermediate thickness. Accordingly a device having a bezel of 0.5 mm or less may be considered a "bezel-less" device. The bezel-less side of the mobile device 100 may be a front-facing side where the user may optimally view the display panel 110. Display panel 110 should be understood to be facing the user. While mobile device 100 is shown as being rectangular, it should be appreciated that the principles of the disclosed subject matter may apply equally to mobile devices of other shapes and sizes. The mobile device 100 may include radar integrated circuits 101-104, each of which may include a pair of Tx/Rx antennas packaged within each radar integrated circuit 101-104. The antennas packaged within each radar integrated circuit 101-104 may be of a cross-feeding dipole type, patch type, slot type, loop type, Yagi type, other type, or combination of types. It should be appreciated that the Tx/Rx antennas may be implemented as a single antenna utilized for both transmission and reception or may be implemented separately with one or more dedicated antennas for transmission and one or more dedicated antennas for reception. The number of transmission antennas may differ from the number of reception antennas.

One or more of radar integrated circuits 101-104 may be located on one or more of the four sides of the mobile device 100 and may be located at any position along each side. Radar integrated circuits 101-104 need not be placed symmetrically nor opposite one another. One or more of radar integrated circuits 101-104 may be positioned to transmit and receive radar signals from the mobile device 100 so as to avoid obstruction by the display panel 110. For example, each circuit and antenna may be positioned such that the main lobe of radar transmissions by the circuit extends in a direction generally parallel to the plane of the display and outward from the device. Such a configuration may avoid or reduce potential obstruction or interference by the display panel or other components of the device because at least this portion of the transmission may avoid attenuation by the display panel or other components of the device. Furthermore, such arrangements may still provide acceptable "coverage" to provide and detect movement, gestures, objects, and the like in regions along a line perpendicular to the display, at least in part because one or more side and/or back lobe(s) of transmission may extend into such areas, including areas in front of the display and behind the device. This "generally parallel" transmission via the main lobe of the radar antenna(s) may occur within an area defined by an arc originating at the antenna. For example, radar signals may be transmitted and/or received through a 180, 220, 250, 270, 300, 330, or 360 degree arc centered on the antenna. Such an arc may face away from a middle of the display panel 110 and may thus extend outward with respect to an outer edge of the mobile device 100 at which the respective antenna is located. As a specific example, referring to FIGS. 1-7, the main lobe of radar signals transmitted parallel to the display panel may be emitted in a direction generally in the plane of the page, or within an arc originating at an edge of the device and extending above and below the plane of the page. In some cases, as disclosed in further detail herein, radar waves emitted "generally parallel" or "parallel" to a display panel also may propagate above and below the plane of the display panel to some extent, thereby allowing for objects and movement to be detected in front of the display panel (i.e., in a direction out of the plane of the page in FIGS. 1-7). In addition, side lobe transmissions of the radar circuit(s) also may extend above and below the plane of the display panel as shown, thereby allowing for detection of objects and movement in those regions while still allowing the radar circuit(s) to be placed in a relatively small bezel area, or at the edge of a bezel-less device. A direction may be considered "generally parallel" even if the primary direction of emission and/or propagation is not exactly parallel to the display panel. For example, main lobe emissions may extend in a primary direction that is within 5 degrees, 10 degrees, 15 degrees, 20 degrees, 25 degrees, or 30 degrees of a direction exactly parallel to the plane of the display panel may be considered "generally parallel" as disclosed herein. Similarly, radar signals transmitted "generally perpendicular" to the display panel, such as would occur from the main lobe of a conventional radar circuit, may be emitted in a direction generally perpendicular to the page, i.e., directed into or out of the page, and may not be exactly perpendicular to the same extent. For example, main lobe emissions may extend in a primary direction that is within 5 degrees, 10 degrees, 15 degrees, 20 degrees, 25 degrees, or 30 degrees of a direction exactly perpendicular to the plane of the display panel may be considered "generally perpendicular" as disclosed herein.

Figure 2:
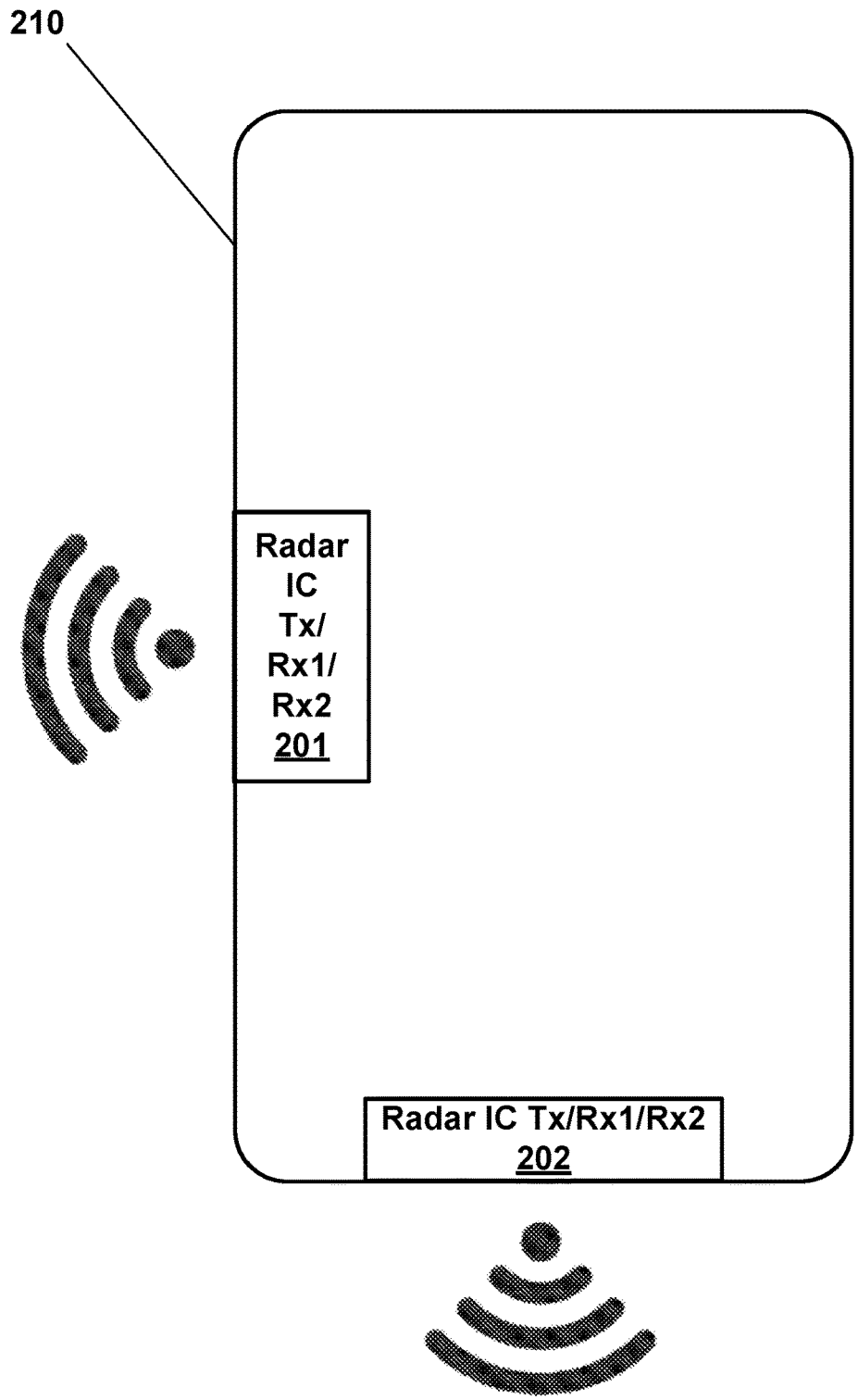
FIG. 2 is a conceptual diagram illustrating a mobile device having up to two radar integrated circuits, in accordance with one or more aspects of the disclosure.

FIG. 2 illustrates an example arrangement of radar components within a mobile device 200 having a bezel-less display panel 210. Display panel 210 should be understood to be facing the user. While mobile device 200 is shown as being rectangular, it should be appreciated that the principles of the disclosed subject matter may apply equally to mobile devices of other shapes and sizes. The mobile device 200 may include radar integrated circuits 201 and 202, each of which may include a Tx antenna and a pair of Rx antennas Rx1/Rx2 packaged within each radar integrated circuit 201 and 202. The antennas Tx/Rx1/Rx2 packaged within each integrated circuit 201 and 202 may be of a cross-feeding dipole type, patch type, slot type, loop type, Yagi type, other type, or combination of types. It should be appreciated that the Tx/Rx antennas may be implemented as a single antenna utilized for both transmission and reception or may be implemented separately with one or more dedicated antennas for transmission and one or more dedicated antennas for reception. The number of transmission antennas may differ from the number of reception antennas. One or more of radar integrated circuits 201 and 202 may be located on one or more sides of the four sides of the mobile device 200 and may be located at any position along each side. Radar integrated circuits 201 and 202 need not be placed symmetrically nor opposite one another. One or more of radar integrated circuits 201 and 202 may be positioned to transmit and receive radar signals from the mobile device 200 to avoid obstruction by the display panel 210. Stated another way, one or more of radar integrated circuits 201-202 may be positioned to transmit and receive radar signals having a main lobe oriented in a direction generally parallel to the display panel 210 of the mobile device 200 as previously disclosed. Notably, in this and the other examples disclosed herein, the direction of radiation emitted by the antenna(s) may be the same as or different than an orientation of the associated radar antenna. For example, in a bezel-less device, an antenna may be oriented such that the main lobe transmissions extend in a direction generally parallel to the display as previously described. However, this may not place a limit on the specific orientation of the associated radar circuit and/or one or more antennas, since various different antenna types and configurations may be used as disclosed herein.

Figure 3:
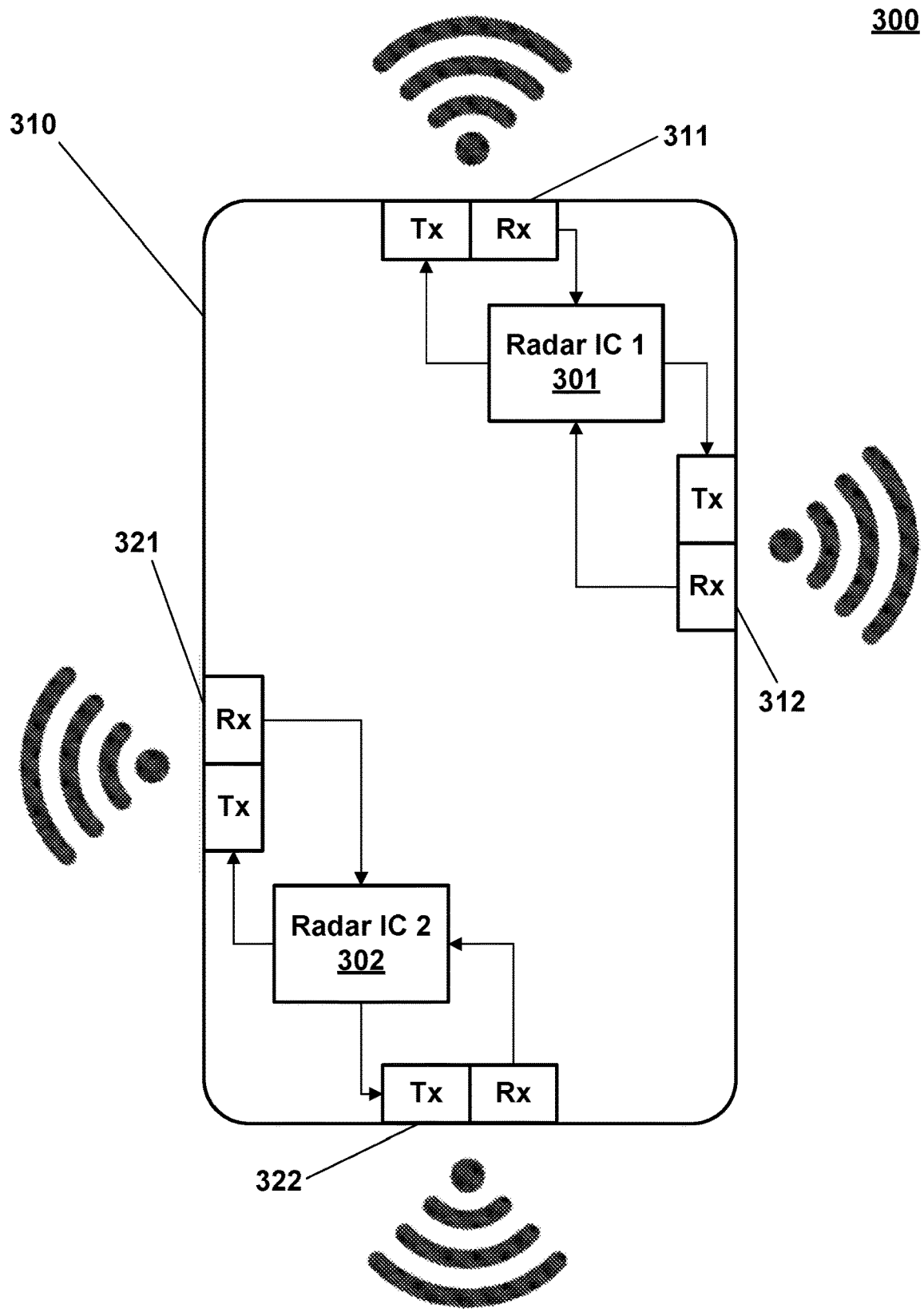
FIG. 3 is a conceptual diagram illustrating a mobile device having a minimal bezel or no bezel, in accordance with one or more aspects of the disclosure.

FIG. 3 illustrates an example arrangement of radar components within a mobile device 300 having a bezel-less display panel 310. Display panel 310 should be understood to be facing the user. While mobile device 300 is shown as being rectangular, it should be appreciated that the principles of the disclosed subject matter may apply equally to mobile devices of other shapes and sizes. The mobile device 300 may include a first radar integrated circuit 301, which may be electrically coupled to a first pair of Tx/Rx antennas 311 and a second pair of Tx/Rx antennas 312. The electrical coupling may be accomplished, for example, via a 60 GHz or 120 GHz interconnect. Mobile device 300 may also include a second radar integrated circuit 302, which may be electrically coupled to a first pair of Tx/Rx antennas 321 and a second pair of Tx/Rx antennas 322. The Tx/Rx antennas 311, 312, 321, 322 may be of a cross-feeding dipole type, patch type, slot type, loop type, Yagi type, other type, or combination of types. It should be appreciated that the Tx/Rx antennas may be implemented as a single antenna utilized for both transmission and reception or may be implemented separately with one or more dedicated antennas for transmission and one or more dedicated antennas for reception. One or more of radar integrated circuits 301 and 302 may be located on one or more sides of the four sides of the mobile device 300 and may be located at any position along each side. The Tx/Rx antennas 311, 312, 321, 322 need not be placed symmetrically nor opposite one another with mobile device 300. One or more of radar integrated circuits 301 and 302 may be positioned to transmit and receive radar signals from the mobile device 300 to avoid obstruction by the display panel 310. Stated another way, one or more of radar integrated circuits 301 and 302 may be positioned to transmit and receive radar signals having a main lobe oriented in a direction generally parallel to the display panel 310 of the mobile device 300 as previously disclosed.

Figure 4:
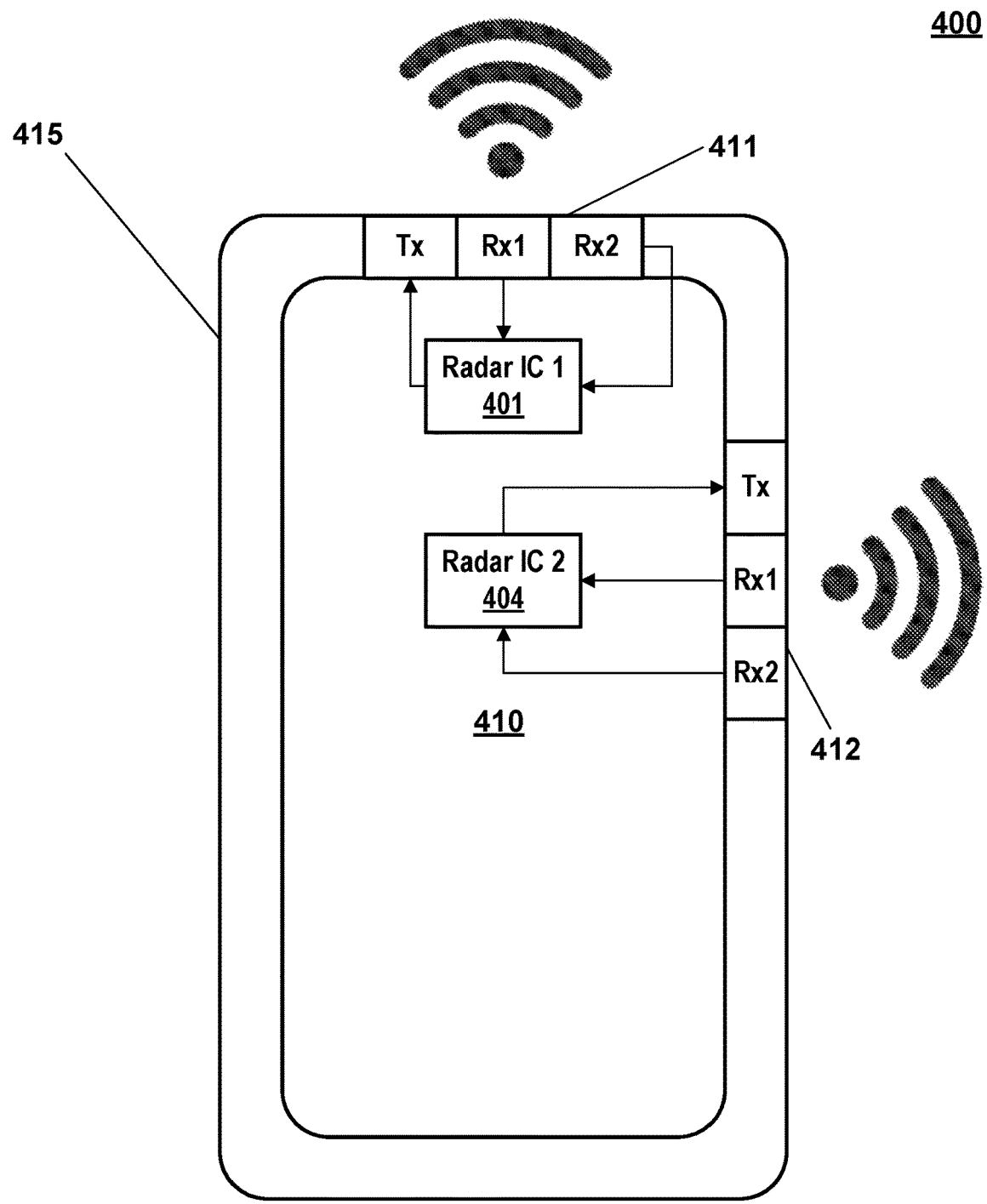
FIG. 4 is a conceptual diagram illustrating a mobile device including at least two radar integrated circuits and associated antennas, in accordance with one or more aspects of the disclosure.

FIG. 4 illustrates an example arrangement of radar components within a mobile device 400 having a display panel 410 with a bezel 415. Display panel 410 should be understood to be facing the user. While mobile device 400 is shown as being rectangular, it should be appreciated that the principles of the disclosed subject matter may apply equally to mobile devices of other shapes and sizes. Bezel 415 may surround at least a portion of display panel 410 and may be of any thickness, for example 1.0-1.5 mm, but preferably 1 mm or less. The thickness of a bezel generally can be measured as, and refers to, the distance between the outermost edge of the active area of the display panel and the outermost edge of the device. In some cases, a bezel may be uniform around the outer perimeter of the device, while in others the bezel may be thicker or thinner in different portions. For instance, a bezel may be relatively thin or non-existent on sides of mobile device 400 and be 1.0-1.5 mm on the top and/or bottom of mobile device 400.

While bezel 415 may be positioned underneath or inside of a cover glass of display panel 410, bezel 415 may lack active display pixels. The mobile device 400 may include a first radar integrated circuit 401, which may be electrically coupled to a first set of antennas 411 including a Tx antenna and a pair of Rx antennas Rx1/Rx2. The mobile device 400 may also include a second radar integrated circuit 402, which may be electrically coupled to a second set of antennas 412 including a Tx antenna and a pair of Rx antennas Rx1/Rx2. The electrical coupling may be accomplished, for example, via a 60 GHz or 120 GHz interconnect. The Tx/Rx antennas of the first set of antennas 411 and second set of antennas 412 may be of a cross-feeding dipole type, patch type, slot type, loop type, Yagi type, other type, or combination of types. Patch antennas may be approximately 0.7 mm wide, thus allowing for fitting within the area occupied by bezel 415 of mobile device 400. The width of bezel 415 may be configured based on the size and type of antenna(s) selected such that the antenna(s) may fit within the area occupied by bezel 415. It should be appreciated that the Tx/Rx1/Rx2 antennas within the first set of antennas 411 and the Tx/Rx1/Rx2 antennas within the second set of antennas 412 may be implemented as a single antenna utilized for both transmission and reception or may be implemented separately with one or more dedicated antennas for transmission and one or more dedicated antennas for reception. The number of transmission antennas may differ from the number of reception antennas. One or more of radar integrated circuits 401 and 402 may be located within the mobile device 400, while the first and second sets of antennas 411/412 may be located along one or more sides of the four sides of the mobile device 400 and may be located at any position along each side, such as within the bezel 415. Alternatively, or in addition, radar integrated circuits 401 and 402 may be collocated with antennas 411/412. The first and second sets of antennas 411/412 need not be placed symmetrically nor opposite one another within mobile device 400. One or more of radar integrated circuits 401 and 402 and the associated first and second sets of antennas 411/412 may be positioned to transmit and receive radar signals having a main lobe oriented toward the user of mobile device 400, i.e., generally perpendicular to the display and out of the page in FIG. 4. Alternatively or in addition, one or more of the circuits 401, 402 may be oriented such that the main lobe emission lies along a direction generally parallel to the plane of the display, and extending from the sides, top, or bottom of mobile device 400. Because the first and second sets of antennas 411/412 may be located within the bezel 415 of the mobile device 400, attenuation of incoming and outgoing radar signals due to display panel 410 may be reduced or eliminated.

Figure 5:
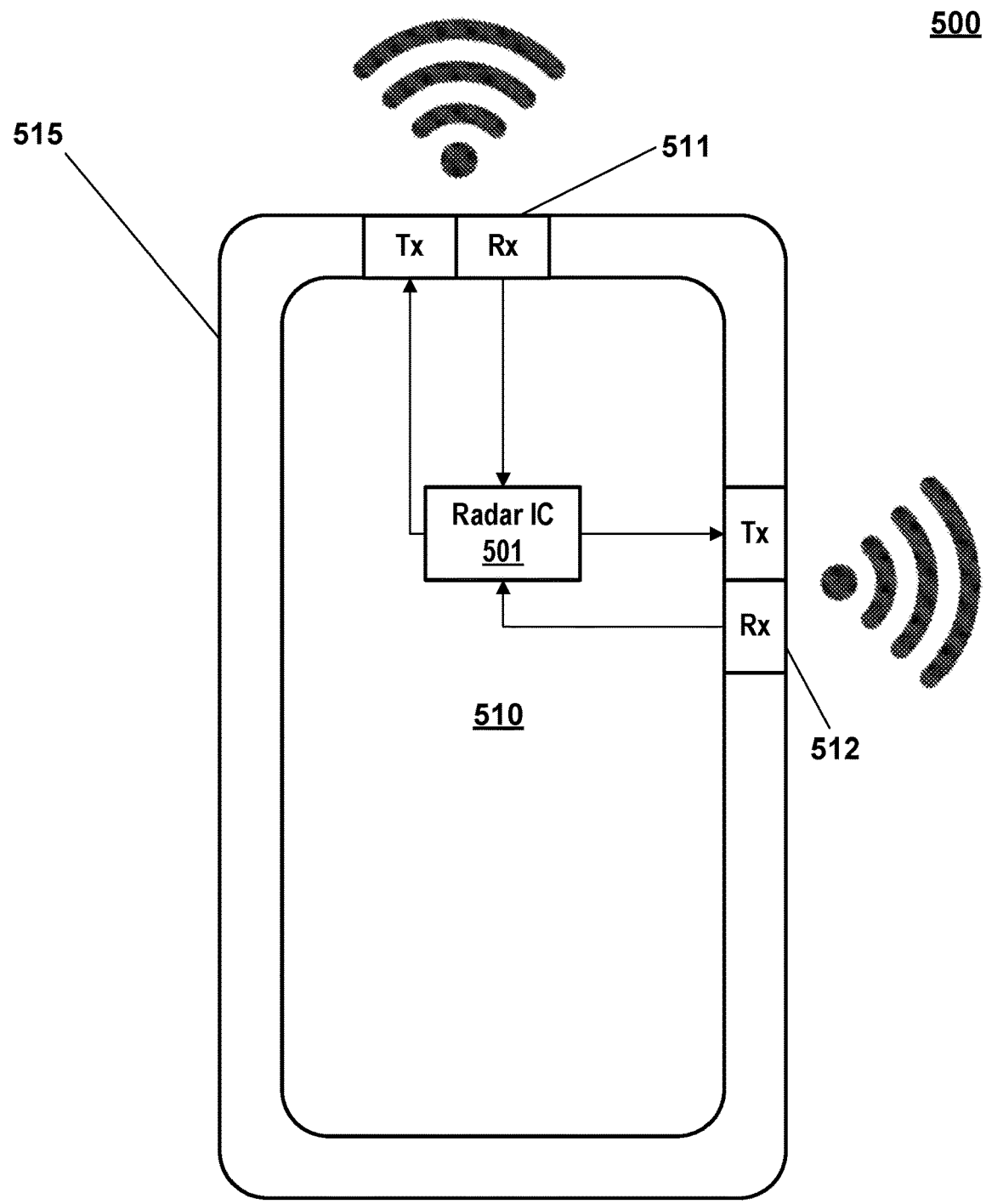
FIG. 5 is a conceptual diagram illustrating an example arrangement of radar components within a mobile device, in accordance with one or more aspects of the disclosure.

FIG. 5 illustrates an example arrangement of radar components within a mobile device 500 having a display panel 510 with a bezel 515. Display panel 510 should be understood to be facing the user. While mobile device 500 is shown as being rectangular, it should be appreciated that the principles of the disclosed subject matter may apply equally to mobile devices of other shapes and sizes. Bezel 515 may surround at least a portion of display panel 510 and may be of any thickness, for example, 1.0-1.5 mm, but preferably 1 mm or less. While bezel 515 may be positioned underneath or inside of a cover glass of display panel 510, bezel 515 may lack active display pixels. The mobile device 500 may include a radar integrated circuit 501, which may be electrically coupled to a first pair of Tx/Rx antennas 511 and a second pair of Tx/Rx antennas 512. The electrical coupling may be accomplished, for example, via a 60 GHz or 120 GHz interconnect. The first and second pair of Tx/Rx antennas 511/512 may be of a cross-feeding dipole type, patch type, slot type, loop type, Yagi type, other type, or combination of types. Patch antennas may be, for example, approximately 0.7 mm wide, thus allowing for fitting within the bezel area 515 of mobile device 500. The width of bezel 515 may be configured based on the size and type of antenna(s) selected such that the antenna(s) may fit within the bezel area 515. It should be appreciated that the Tx/Rx antennas within the first and second pairs 511/512 of Tx/Rx antennas may be implemented as a single antenna utilized for both transmission and reception or may be implemented separately with one or more dedicated antennas for transmission and one or more dedicated antennas for reception. The number of transmission antennas may differ from the number of reception antennas. The radar integrated circuit 501 may be located within the mobile device 500, while the first and second pairs of Tx/Rx antennas 511/512 may be located on one or more sides of the four sides of the mobile device 500 and may be located at any position along each side. The first and second pairs of Tx/Rx antennas 511/512 need not be placed symmetrically nor opposite one another. The radar integrated circuit 501 and the associated first and second pairs of Tx/Rx antennas 511/512 may be positioned to transmit and receive radar signals having a main lobe oriented toward the user of mobile device 500, i.e., generally perpendicular out of the page, toward the user. Alternatively or in addition, radar integrated circuit 501 and the associated first and second pairs of Tx/Rx antennas 511/512 may be oriented such that the main lobe emission lies along a direction generally parallel to the plane of the display, and extending from the sides, top, or bottom of mobile device 500. Because the first and second pairs of Tx/Rx antennas 511/512 may be located within the bezel 515 of mobile device 500, attenuation of incoming and outgoing radar signals from display panel 510 may be reduced.

Figure 6:
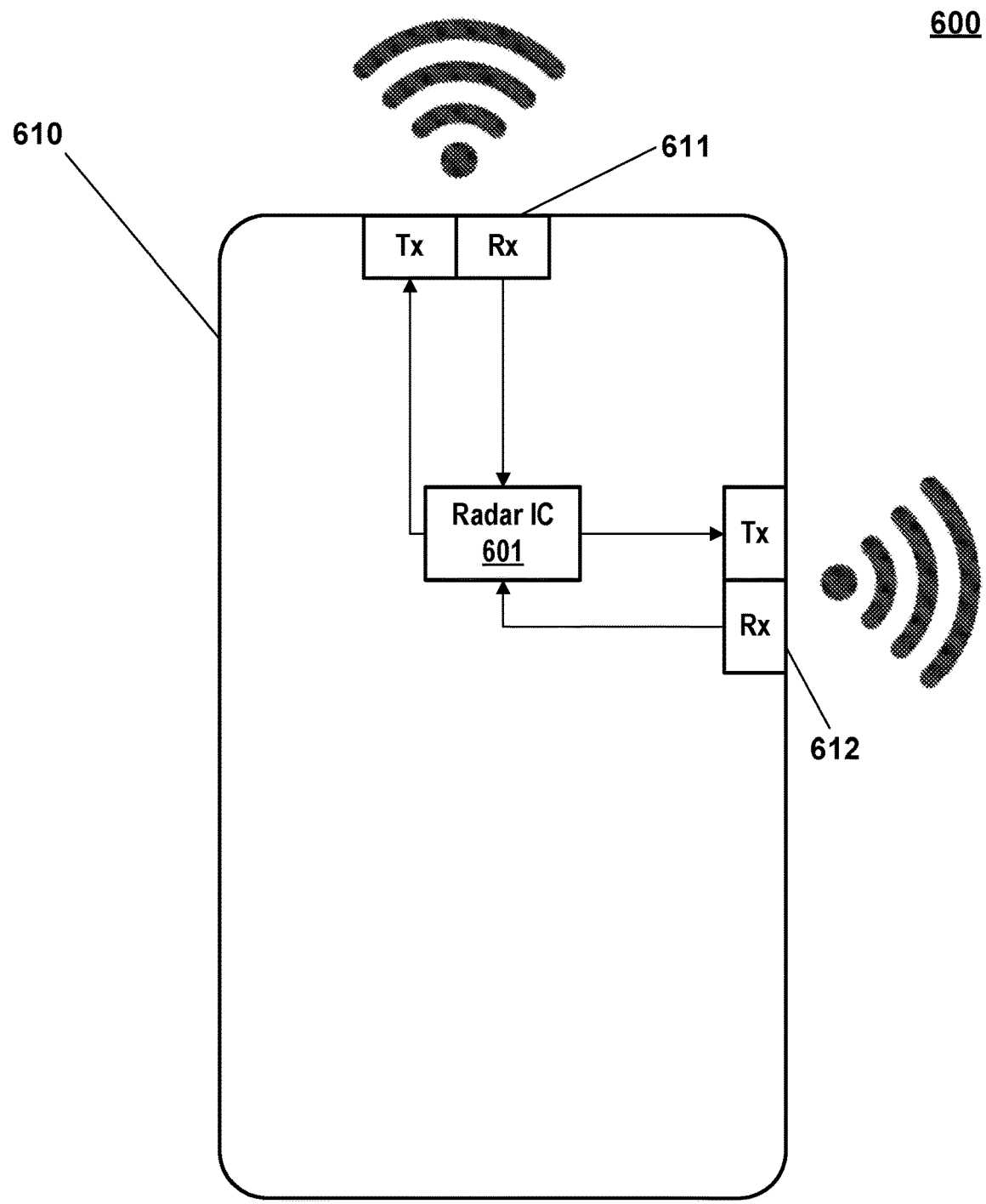
FIG. 6 is a conceptual diagram illustrating an example arrangement of radar components within a mobile device having minimal or no bezel, in accordance with one or more aspects of the disclosure.

FIG. 6 illustrates an example arrangement of radar components within a mobile device 600 having a bezel-less display panel 610. Display panel 610 should be understood to be facing the user. While mobile device 600 is shown as being rectangular, it should be appreciated that the principles of the disclosed subject matter may apply equally to mobile devices of other shapes and sizes. The mobile device 600 may include a radar integrated circuit 601, which may be electrically coupled to a first pair of Tx/Rx antennas 611 and a second pair of Tx/Rx antennas 612. The electrical coupling may be accomplished, for example, via a 60 GHz or 120 GHz interconnect. The first and second pair of Tx/Rx antennas 611/612 cross-feeding dipole type, patch type, slot type, loop type, Yagi type, other type, or combination of types. The first and second pair of Tx/Rx antennas 611/612 may be integrated above an active display layer and constructed to be optically invisible at least in the radar wavelengths, and in some cases to all visible, radar, infrared, and/or ultraviolet wavelengths, with approximately 80% or greater optical transparency, preferably at least 85% optical transparency, preferably greater than 88%. It should be appreciated that the Tx/Rx antennas within the first and second pairs of Tx/Rx antennas 611/612 may be implemented as a single antenna utilized for both transmission and reception or may be implemented separately with one or more dedicated antennas for transmission and one or more dedicated antennas for reception. The number of transmission antennas may differ from the number of reception antennas. The radar integrated circuit 601 may be located within the mobile device 600, while the first and second pairs of Tx/Rx antennas 611/612 may be located on one or more sides of the four sides of the mobile device, as shown, or at any other location above the active display layer of display panel 610. The first and second pairs of Tx/Rx antennas 611/612 need not be placed symmetrically nor opposite one another. The radar integrated circuit 601 and the associated first and second pairs of Tx/Rx antennas 611/612 may be positioned to transmit radar signals having a main lobe oriented toward the user of mobile device 600, i.e., out of the page. Alternatively or in addition, one or more of the circuits 401, 402 may be oriented such that the main lobe emission lies along a direction generally parallel to the plane of the display, and extending from the sides, top, or bottom of mobile device 600. Because the first and second pairs of Tx/Rx antennas 611/612 may be located above the active display layer of display panel 610, attenuation of incoming and outgoing radar signals from display panel 610 may be reduced or eliminated.

Figure 7:
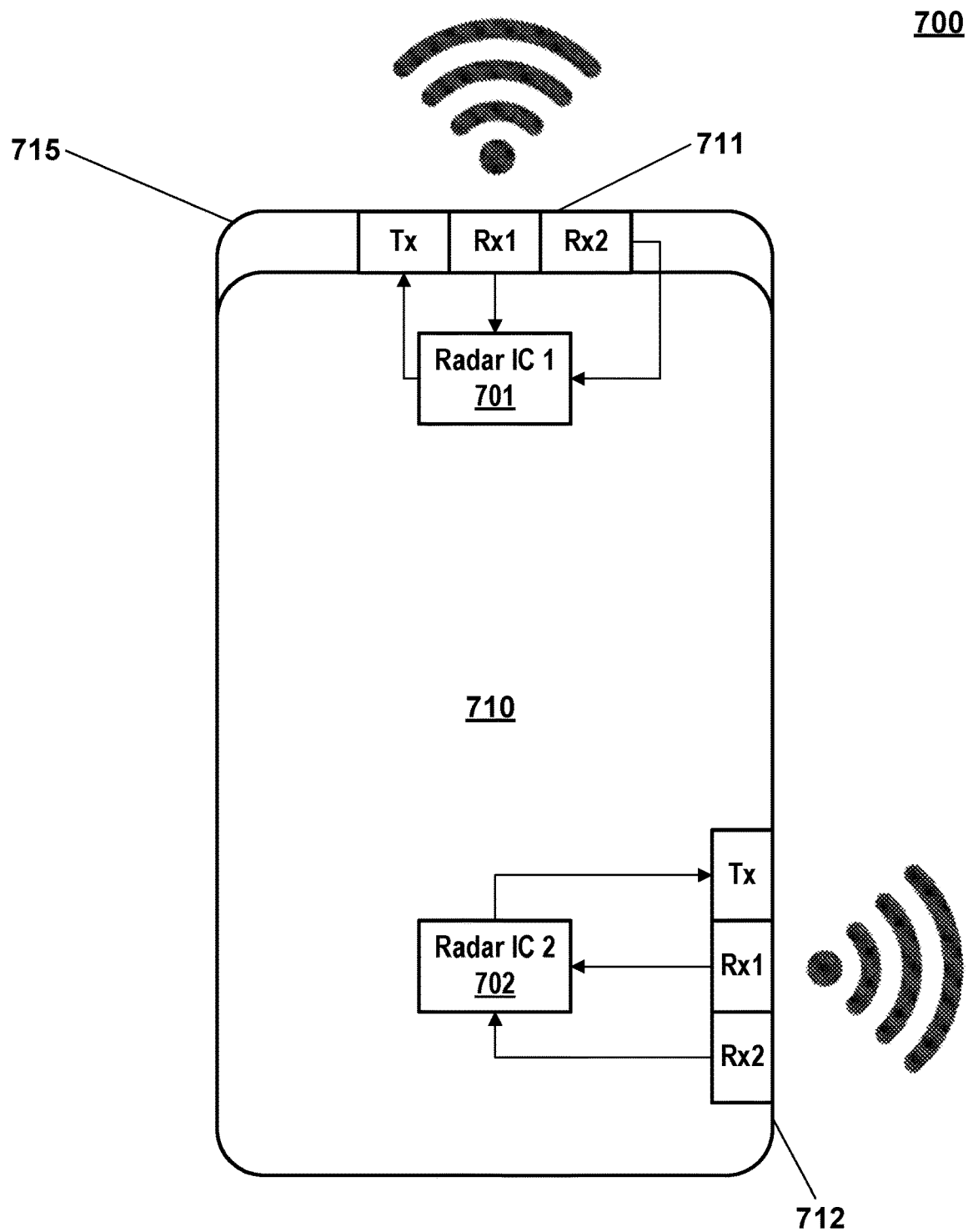
FIG. 7 is a conceptual diagram illustrating an example arrangement of radar components within a mobile device having a bezel, in accordance with one or more aspects of the disclosure.

FIG. 7 illustrates an example arrangement of radar components within a mobile device 700 having a display panel 710 with a bezel 715. Display panel 710 should be understood to be facing the user. While mobile device 700 is shown as being rectangular, it should be appreciated that the principles of the disclosed subject matter may apply equally to mobile devices of other shapes and sizes. Bezel 715 may surround at least a portion of display panel 710 and may be of any thickness, for example, 1.0-1.5 mm, but preferably 1 mm or less. As shown in FIG. 7, bezel 715 may only occupy a top portion of display panel 710. While bezel 715 may be positioned underneath or inside of a cover glass of display panel 710, bezel area 715 may lack active display pixels. The mobile device 700 may include a first radar integrated circuit 701, which may be electrically coupled to a first pair of Tx/Rx antennas 711 including a Tx antenna and a pair of Rx antennas Rx1/Rx2. The mobile device 700 may also include a second radar integrated circuit 702, which may be electrically coupled to a second set of antennas 712 including a Tx antenna and a pair of Rx antennas Rx1/Rx2. Second radar integrated circuit 702 may preferably be located toward the bottom of mobile device 700. The electrical coupling may be accomplished, for example, via a 60 GHz or 120 GHz interconnect. The Tx/Rx antennas of the first set 711 and second set 712 may be of a cross-feeding dipole type, patch type, slot type, loop type, Yagi type, other type, or combination of types. Patch antennas may be, for example, approximately 0.5-0.7 mm wide, thus allowing for fitting within the bezel area 715 of mobile device 500. The width of bezel 715 may be configured based on the size and type of antenna(s) selected such that the antenna(s) may fit within the bezel area 715. It should be appreciated that the Tx/Rx1/Rx2 antennas within first set of antennas 711 and the Tx/Rx1/Rx2 antennas within the second set of antennas 712 may be implemented as a single antenna utilized for both transmission and reception or may be implemented separately with one or more dedicated antennas for transmission and one or more dedicated antennas for reception. The number of transmission antennas may differ from the number of reception antennas. One or more of radar integrated circuits 701/702 may be located within the mobile device 700, while the first and second sets of antennas 711/712 may be located on one or more sides of the four sides of the mobile device 700 and may be located at any position along each side. Because the first set of antennas 711 may be located within bezel area 715, the first set of antennas may transmit and receive radar signals having a main lobe oriented toward the user, i.e., out of the page, or having a main lobe oriented toward the top of mobile device 700, i.e., generally parallel to the display. Transmitting and receiving radar signals toward the user may improve the ability of mobile device 700 to detect gestures performed in front of display panel 710. The second set of antennas 712 may be positioned to transmit and receive radar signals having a main lobe oriented in a direction generally parallel to the display and originating from the sides, or bottom of mobile device 700 as previously disclosed. The first and second sets of antennas 711/712 need not be placed symmetrically nor opposite one another.

In any of the previously-discussed examples, one or more radar integrated circuits may "share" an antenna with another component of the mobile device 100/200/300/400/500/600/700 rather than a dedicated antenna or antenna set. For example, a radar integrated circuit may utilize a WiFi antenna, 5G antenna, cellular carrier antenna, or other antenna for the purpose of transmitting and receiving radar signals.

During operation, mobile computing devices disclosed herein may transmit radar waves from the various antennas described for each arrangement and receive reflections of those waves off objects in the vicinity of the device, such as a user's hand or hands or portions of a user's hand(s). The resulting radar reflections may be used to identify movements, gestures, and the like, as is known in the art. Arrangements disclosed herein may emit and receive radar waves in a direction away from the device, generally centered on a line in the plane of the device. However, radar waves may be emitted and received within a 180-degree, 210-degree, 240-degree, or greater arc centered on such a line, thereby allowing for transmission and receipt of signals to areas in front of the device. For example, examples disclosed herein may allow for detection of gestures performed over or in front of the display of a phone, tablet, or other display, although one or more antennas used in the example may not be arranged to emit or receive radar waves initially in a direction generally perpendicular to the screen of the device, i.e., directly toward a user.

As a specific example, referring to the arrangement shown in FIG. 1, mobile device 100 may transmit radar waves using a pair of Tx/Rx antennas packaged within each of radar integrated circuits 101-104. The radar integrated circuits 101-104 may transmit radar waves simultaneously, sequentially, in pairs, continuously, at regular or irregular intervals, and/or in response to one or more events occurring. One or more of the Tx/Rx antennas may be positioned to transmit and receive from the sides of mobile device 100 to avoid obstruction by the display panel 110 and to achieve a quasi-isotropic beam pattern. Stated another way, the Tx/Rx antennas may be positioned to transmit and/or receive radar waves having a main lobe oriented in a direction generally parallel to the display panel 110 of the mobile device 100 as previously disclosed. Radar reflections may also be received by one or more of the Tx/Rx antennas in order to detect human gestures and human proximity. Based on the arrangement of the radar integrated circuits 101-104 and the beam pattern associated with the integrated Tx/Rx antennas, detection of human gestures and human proximity may be detected from virtually any direction of the mobile device 100 even though radar waves transmitted and received through display panel 110 may be substantially attenuated as previously discussed. Mobile device 100 may use triangulation to determine the direction of a user's hand or hands or portions of a user's hand(s). Alternatively, or in addition, where pairs of Rx antennas are coupled to one or more radar integrated circuits, other methods, such as trilateration, may be employed. It should be appreciated that any combination of dipole antennas, patch antennas, or other types of antennas with complementary radiation patterns may be used in mobile device 100.

Similarly, each of the other examples disclosed herein may perform functions similar to those described with respect to FIG. 1 to obtain radar data, as will be readily understood by one of skill in the art. This data then may be used to detect and identify gestures made by a user of the device, or any other item, movement, or the like.

As disclosed herein, one or more radar circuits and antennas may be positioned such that they exhibit main lobe emission in a particular direction. As is known in the art, a "main lobe" of an antenna refers to the portion of the radiation emission pattern that exhibits the highest power and the greatest field strength. Similarly, most antenna radiation patterns also exhibit side lobes, which refer to lobes of the radiation pattern that have a lower power and field strength. Side lobes often are considered undesirable, especially for highly-directional applications. However, as previously disclosed, side lobe emissions may be used by examples disclosed herein to detect objects in areas of interest and thus may not be undesirable. Many antennas also exhibit back lobe emission, which refers to the lobe of the radiation pattern that is directly opposite the main lobe. Back lobes often have a higher power and field strength than side lobes, but typically not as high as the main lobe. In examples disclosed herein, the back lobe may be used to identify objects above in front of or behind a device display panel, as previously disclosed. Antenna radiation patterns often are described in terms of the directionality of the main lobe and, in some cases, any side lobes of interest. For example, mobile computing devices disclosed herein may include main lobe emissions that occur in a direction generally parallel to the plane of a display panel, in directions extending outward from an edge of the display panel. The main lobe generally is not confined to a single direction, but may extend outward within an arc as previously disclosed. Side lobes may extend outward from the same origination point, such as the radar circuits disclosed herein, but in directions different than the main lobe. For example, if a radar circuit as disclosed herein is considered to provide main lobe emission at 0 degrees along an axis extending out of the top of a mobile device (i.e., toward the top of the page in FIGS. 1-7, in the plane of the page), side lobes may extend at any angle from the circuit outside of the main lobe, including 0-360 degrees. Such side lobes thus may extend through the display panel, the back of the device, and the like, including out of or into the page in FIGS. 1-7.

Figure 8:
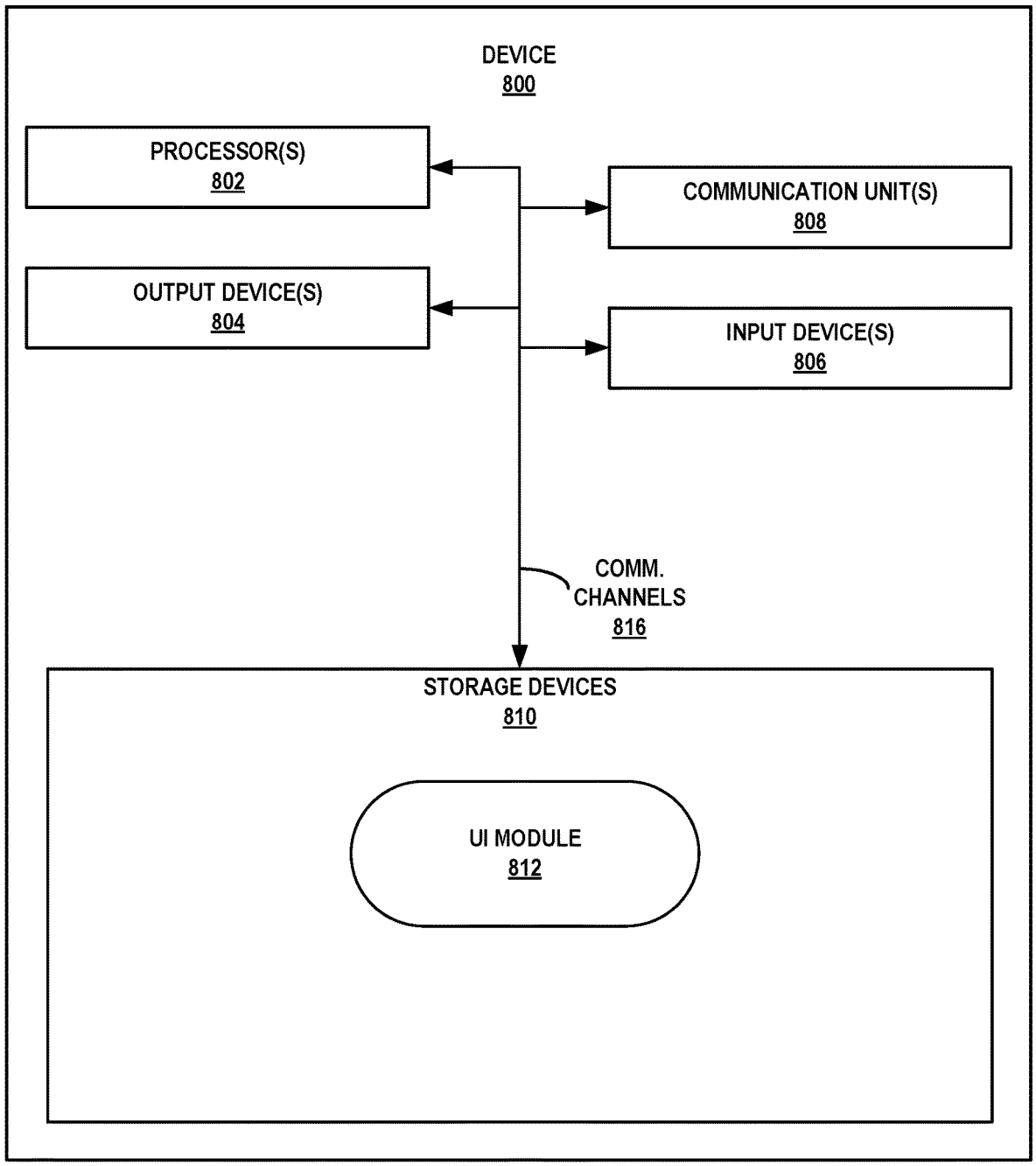
FIG. 8 is a block diagram illustrating component of a mobile device including radar components, in accordance with one or more aspects of this disclosure.

FIG. 8 is a block diagram illustrating component of a device including radar components, in accordance with one or more aspects of this disclosure. In the example of FIG. 8, device 800 can be any device that includes a display and radar components. Examples of device 2 include, but are not limited to, a mobile phone, a camera device, a tablet computer, a smart display, a laptop computer, a desktop computer, a gaming system, a media player, an e-book reader, a television platform, a vehicle infotainment system or head unit, a countertop device, or a wearable computing device (e.g., a computerized watch, a head mounted device such as a VR/AR headset, computerized eyewear, a computerized glove). Device 800 of FIG. 8 may be considered to be an example of any of devices 100, 200, 300, 400, 500, 600, or 700 discussed above with reference to FIGS. 1-7. Specifically, device 800 may be either a bezel device or a bezel-less device.

As shown in FIG. 8, device 800 may include one or more processors 802, one or more output devices 804, one or more input devices 806, one or more communication units 808, and one or more storage devices 810. Storage devices 810 may also include user interface (UI) module 812. FIG. 8 illustrates only one particular example of device 800 and many other examples of device 800 may be used in other instances. Device 800 of FIG. 8 may include a subset of the components included in example device 800 or may include additional components not shown in FIG. 8.

Communication channels 816 may interconnect each of the components 802, 804, 806, 808, and 810 for inter-component communications (physically, communicatively, and/or operatively). In some examples, communication channels 816 may include a power bus, a system bus, a network connection, an inter-process communication data structure, or any other method for communicating data or transferring power.

One or more output devices 804 may generate output. Examples of output are tactile, audio, and video output. Output devices 804, in one example, includes a presence-sensitive display, sound card, video graphics adapter card, speaker, liquid crystal display (LCD), or any other type of device for generating output to a human or machine. As discussed above, a display of output devices 804 may be include a bezel or may be bezel-less.

One or more input devices 806 may receive input. Examples of input are tactile, audio, and video input. Input devices 806, in some examples, includes a presence-sensitive display, touch-sensitive screen, mouse, keyboard, voice responsive system, video camera, microphone, sensor, or any other type of device for detecting input from a human or machine. In accordance with one or more techniques of this disclosure input device 806 may include radar hardware (e.g., one or more transmission antennas, one or more reception antennas, and supporting circuitry).

One or more communication units 808 may communicate with external devices via one or more wired and/or wireless networks by transmitting and/or receiving network signals on the one or more networks. Examples of communication units 808 include a network interface card (e.g. such as an Ethernet card), an optical transceiver, a radio frequency transceiver, a GPS receiver, or any other type of device that can send and/or receive information. Other examples of communication units 808 may include short wave radios, cellular data radios, wireless network radios (e.g., WIFI radios, BLUETOOTH radios, etc.), as well as universal serial bus (USB) controllers, HDMI controllers, and the like.

One or more storage devices 810 within source device 800 may store information for processing during operation of device 800 that module 812 access during execution at device 800). In some examples, storage device 810 is a temporary memory, meaning that a primary purpose of storage device 810 is not long-term storage. Storage devices 810 on device 800 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 810, in some examples, include one or more computer-readable storage media. Storage devices 810 may be configured to store larger amounts of information than volatile memory. Storage devices 810 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage devices 810 may store program instructions and/or information (e.g., data) associated with module 812.

One or more processors 802 may implement functionality and/or execute instructions within device 800. For example, processors 802 may receive and execute instructions stored by storage devices 810 that execute the functionality of module 812. Processors 802 may execute instructions of module 812 to perform various actions or functions of device 800.

UI module 812 manages user interactions with other components of device 800. In other words, UI module 812 may act as an intermediary between various components of device 800 to make determinations based on user input and generate output in response to the user input. UI module 812 may receive instructions from an application, service, platform, or other module of device 800 to cause a device to output a user interface. UI module 812 may manage inputs received by device 800 as a user views and interacts with the user interface and update the user interface in response to receiving additional instructions from the application, service, platform, or other module of device 800 that is processing the user input.

In accordance with one or more techniques of this disclosure, device 800 may include a bezel around a display of output devices 804 and may further include one or more radar components integrated into the bezel. For example, device 800 may include a display panel assembly including a plurality of active display pixels arranged on a plane; a bezel surrounding at least a portion of the display panel assembly; a first radar transmission antenna disposed within the bezel; a first radar reception antenna disposed within the bezel; and a first radar integrated circuit configured to transmit radar waves via the first radar transmission antenna and receive radar waves via the first radar reception antenna. In this example, the first radar transmission antenna and the first radar reception antenna are positioned to transmit and receive radar waves having a main lobe oriented in either a direction generally perpendicular to the plane of the display panel assembly or a direction generally parallel to the plane of the display panel assembly.

In accordance with one or more techniques of this disclosure, device 800 may be a bezel-less device that includes a display of output devices 804 and further includes one or more radar components integrated into the bezel. For example, device 800 may include a display panel assembly comprising an active display layer including a plurality of only active display pixels, the display panel assembly defining a bezel-less display panel at a front-face of the mobile computing device; a first radar transmission antenna; a first radar reception antenna; and a first radar integrated circuit configured to transmit radar waves via the first radar transmission antenna and receive radar waves via the first radar reception antenna. In this example, the first radar integrated circuit may be configured to detect proximity of a user or gestures performed by a user.

In either scenario (e.g., bezel or bezel-less), processors 802 may execute UI module 812 to process signals received via the radar components. For instance, processors 802 may execute UI module 812 to process received signals to implement virtual reality or augmented reality features, perform indoor imaging, detect gestures performed by a user, or any combination thereof, or the like.

Generally, unless indicated otherwise explicitly or required by context, when examples disclosed herein are described as detecting radar reflections from objects, such as to detect gestures or other movement, such reflections may be from main lobe, side lobe, or back lobe transmissions, as will be readily understood by one of skill in the art.

The examples disclosed herein may reduce the attenuation associated with transmitting and receiving radar signals in conjunction with an electronic device having a display panel. The examples disclosed herein may be applicable to both mobile and non-mobile electronic devices having any shape and size. Examples disclosed herein may be useful in the context of using radar technology to detect user gestures as a form of input to an electronic device.

The foregoing description, for purpose of explanation, has been described with reference to specific examples. However, the illustrative discussions above are not intended to be exhaustive or to limit examples of the disclosed subject matter to the precise forms disclosed. Many modifications and variations are possible in view of the above teachings. The examples were chosen and described in order to explain the principles of examples of the disclosed subject matter and their practical applications, to thereby enable others skilled in the art to utilize those examples as well as various examples with various modifications as may be suited to the particular use contemplated.

The invention claimed is:

1. A computing device comprising:
a display panel assembly including a plurality of active display pixels arranged on a plane;
a bezel surrounding at least a portion of the display panel assembly;
a first radar transmission antenna integrated into the bezel;
a first radar reception antenna integrated into the bezel; and
a first radar integrated circuit configured to transmit radar waves via the first radar transmission antenna and receive radar waves via the first radar reception antenna,
wherein the first radar transmission antenna and the first radar reception antenna are positioned to transmit and receive radar waves having a main lobe oriented in a direction generally parallel to the plane of the display panel assembly, the main lobe being directed away from a middle of the computing device.

2. The computing device of claim 1, wherein at least a portion of the bezel measures approximately 1.0-1.5 millimeters in thickness.

3. The computing device of claim 1, wherein at least a portion of the bezel measures less than 1.0 millimeters in thickness.

4. The computing device of claim 1, further comprising a second radar reception antenna, wherein the second radar reception antenna is integrated with or electrically coupled to the first radar integrated circuit.

5. The computing device of claim 1, further comprising a second radar transmission antenna and a second radar reception antenna.

6. The computing device of claim 5, further comprising a second radar integrated circuit integrated with or electrically coupled to the second radar transmission antenna and the second radar reception antenna.

7. The computing device of claim 5, wherein the first radar transmission antenna and the first radar reception antenna are positioned to transmit and receive radar waves having a main lobe extending from a top or a bottom of the computing device and the second radar transmission antenna and the second radar reception antenna are positioned to transmit and receive radar waves having a main lobe extending from a left or right side of the computing device.

8. The computing device of claim 5, wherein the second radar transmission antenna and/or the second radar reception antenna are also disposed within the bezel.

9. The computing device of claim 5, wherein the second radar transmission antenna and the second radar reception antenna are not disposed within the bezel.

10. The computing device of claim 9, wherein the second radar transmission antenna and the second radar reception antenna are integrated above a layer of active display pixels of the display panel assembly.

11. The computing device of claim 1, wherein the first radar integrated circuit is configured to detect proximity of a user or gestures performed by a user.

12. A mobile computing device comprising:
a display panel assembly comprising an active display layer including a plurality of only active display pixels, the display panel assembly defining a bezel-less display panel at a front-face of the mobile computing device;
a first radar transmission antenna;
a first radar reception antenna; and
a first radar integrated circuit configured to transmit radar waves via the first radar transmission antenna and receive radar waves via the first radar reception antenna,
wherein the first radar integrated circuit is configured to detect proximity of a user or gestures performed by a user, and
wherein the first radar transmission antenna and the first radar reception antenna are positioned to transmit and receive radar waves having a main lobe oriented in a direction generally parallel to a plane of the display panel assembly, the main lobe of the transmitted waves being directed away from a middle of the display panel.

13. The computing device of claim 12, wherein a display panel of the display panel assembly completely covers a front-face of the computing device.

14. The computing device of claim 12, further comprising:
a second radar reception antenna; and
a second radar transmission antenna.

15. The computing device of claim 14, wherein the first radar transmission antenna and the first radar reception antenna are positioned to transmit and receive radar waves having a main lobe extending from a top of the computing device and the second radar transmission antenna and the second radar reception antenna are positioned to transmit and receive radar waves having a main lobe extending from a left or right side of the computing device.

16. The computing device of claim 14, further comprising a second radar integrated circuit integrated with or electrically coupled to the second radar transmission antenna and the second radar reception antenna.

17. The computing device of claim 12, wherein the first radar transmission antenna and the first radar reception antenna are constructed to be optically invisible with approximately 80% or greater optical transparency.

18. The computing device of claim 12, wherein the first radar transmission antenna and the first radar reception antenna are positioned above the active display layer.

* * * * *